United States Patent
Fishbain et al.

(10) Patent No.: US 10,726,482 B2
(45) Date of Patent: *Jul. 28, 2020

(54) SYSTEM AND METHOD FOR TIMED ORDER ENTRY AND MODIFICATION

(71) Applicant: Trading Technologies International, Inc., Chicago, IL (US)

(72) Inventors: Michael L. Fishbain, Wilmette, IL (US); Sagy Pundak Mintz, Austin, TX (US); Stephen J. Murphy, Oak Park, IL (US)

(73) Assignee: Trading Technologies International, Inc., Chicago, IL (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/727,194

(22) Filed: Oct. 6, 2017

(65) Prior Publication Data

US 2018/0033084 A1    Feb. 1, 2018

Related U.S. Application Data

(63) Continuation of application No. 13/743,002, filed on Jan. 16, 2013, now Pat. No. 9,811,860, which is a continuation of application No. 12/945,654, filed on Nov. 12, 2010, now Pat. No. 8,380,606, which is a continuation of application No. 12/337,415, filed on Dec. 17, 2008, now Pat. No. 7,856,393, which is a continuation of application No. 10/609,869, filed on Jun. 30, 2003, now Pat. No. 7,512,557.

(51) Int. Cl.
*G06Q 40/00* (2012.01)
*G06Q 40/06* (2012.01)
*G06Q 40/04* (2012.01)

(52) U.S. Cl.
CPC .............. *G06Q 40/04* (2013.01); *G06Q 40/00* (2013.01); *G06Q 40/06* (2013.01)

(58) Field of Classification Search
CPC ....................................................... G06Q 40/00
USPC ............................................................ 705/35
See application file for complete search history.

(56) References Cited

U.S. PATENT DOCUMENTS 6,772,132 B1    8/2004   Kemp, II et al.
7,127,424 B2   10/2006   Kemp, II et al.
(Continued)

OTHER PUBLICATIONS

Gold, LM and Post, D., "Invest Online, Do It Yourself and Keep More of What You Earn," featuring e-trade, MacMillian Publishing, 1997.

*Primary Examiner* — Kirsten S Apple
(74) *Attorney, Agent, or Firm* — McDonnell Boehnen Hulbert & Berghoff LLP

(57) ABSTRACT

A system and method for defining and processing timed orders are defined. According to one embodiment, a trader may define a timed order by defining an intra-day time trigger or a time period when the timed order should be automatically modified, such as deleted or cancelled/replaced with a new order. In one embodiment, the intra-day time trigger or time period may be dynamically changed to a later time, for example, upon receiving a predetermined user input. Also, the time trigger and time period may be configured to dynamically vary based on any user configurable formula. Also, the timed order may be associated with one or more actions to be taken once the order is deleted, such as sending a new order, for example.

18 Claims, 5 Drawing Sheets

(56) References Cited

U.S. PATENT DOCUMENTS

| | | | |
|---|---|---|---|
| 7,389,268 B1 | 6/2008 | Kemp, II et al. | |
| 7,483,850 B1 | 1/2009 | Fishbain et al. | |
| 7,512,557 B1 | 3/2009 | Fishbain et al. | |
| 7,617,144 B2 | 11/2009 | Madoff et al. | |
| 7,856,392 B1 | 12/2010 | Fishbain et al. | |
| 7,856,393 B1 | 12/2010 | Fishbain et al. | |
| 8,380,606 B2 | 2/2013 | Fishbain et al. | |
| 2001/0044767 A1 | 11/2001 | Madoff et al. | |
| 2002/0099651 A1* | 7/2002 | May | G06Q 30/08 705/38 |
| 2004/0015431 A1* | 1/2004 | May | G06Q 30/08 705/37 |
| 2006/0015436 A1* | 1/2006 | Burns | G06Q 40/04 705/37 |
| 2006/0085320 A1* | 4/2006 | Owens | G06Q 40/00 705/37 |
| 2011/0078068 A1 | 3/2011 | Fishbain et al. | |
| 2013/0132262 A1 | 5/2013 | Fishbain et al. | |

* cited by examiner

SYSTEM AND METHOD FOR TIMED ORDER ENTRY AND MODIFICATION

CROSS REFERENCE TO RELATED APPLICATIONS

This application is a continuation of U.S. patent application Ser. No. 13/743,002, filed Jan. 16, 2013, now U.S. Pat. No. 9,811,860, which is a continuation of U.S. patent application Ser. No. 12/945,654, filed Nov. 12, 2010, now U.S. Pat. No. 8,380,606, which is a continuation of U.S. patent application Ser. No. 12/337,415, filed Dec. 17, 2008, now U.S. Pat. No. 7,856,393, which is a continuation of U.S. patent application Ser. No. 10/609,869, filed Jun. 30, 2003, now U.S. Pat. No. 7,512,557. U.S. patent application Ser. No. 12/337,401, filed Dec. 17, 2008, now U.S. Pat. No. 7,856,392, and U.S. patent application Ser. No. 11/415,853, filed May 2, 2006, now U.S. Pat. No. 7,483,850, are also continuations of U.S. patent application Ser. No. 10/609,869. The contents of each of the above-mentioned applications are incorporated herein by reference in their entirety in the present application for all purposes.

FIELD OF THE INVENTION

The present invention is directed towards electronic trading. More specifically, the present invention is directed to tools for assisting a trader in trading in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the conditions associated with the order, for example price and quantity, and prioritizes the order with other orders of the same price. When the order conditions are satisfied in the market, a trade occurs and trade information is then relayed in some fashion to one or more client devices. In fact, the host exchanges typically publish a data feed to the client devices so that the traders can have access to the most current market information.

Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all or many price levels, while some provide only quantities associated with the inside market, and others may provide no market depth at all. Additionally, host exchanges can offer other types of market information such as the last traded price (LTP), the last traded quantity (LTQ), and order fill information.

To profit in electronic markets, market participants must be able to assimilate large amounts of data, including market information provided by an exchange and, accordingly, react quicker than other competing market participants to take advantage of profitable market conditions or limit trader's losses. Further, because electronic trading offers tools that enable traders to react to the market so much faster than in the traditional pit environment, a trader risks and may lose a lot of money so much quicker.

One of many risks that traders are facing in an electronic trading environment is having unfilled orders pending at an exchange after the end of the trading session, and risking a huge loss when the market moves against the trader's position the next day. To avoid such risks, some exchanges now offer good-till-day ("GTD") orders that are automatically deleted by an exchange at the end of the trading session. Other traders, on the other hand, don't mind taking such risks and keep their unfilled orders pending at an exchange for a number of consecutive days. Such traders, however, don't want to have their orders pending indefinitely and often take advantage of another order type offered by some exchanges, i.e., a good-till-date ("GTDate") order type, that causes an exchange to delete a pending unfilled order at the end of a trading session on a specific date. Some exchange also allow traders to submit orders known as "on market close" orders, which, rather than being deleted at the end of the trading session, get executed at the end of the trading session. Even though the existing order types provide some assistance to traders, they don't provide flexibility desired by most traders and limit traders to keeping their orders pending until the end of the trading session or until a specific date. It is therefore desirable to offer automatic tools that can assist a market participant in adapting his or her trading strategy to an electronic marketplace.

BRIEF DESCRIPTION OF THE FIGURES

Example embodiments of the present invention are described herein with reference to the following drawings, in which.

DETAILED DESCRIPTION

I. Timed Orders Overview

Figure 1:
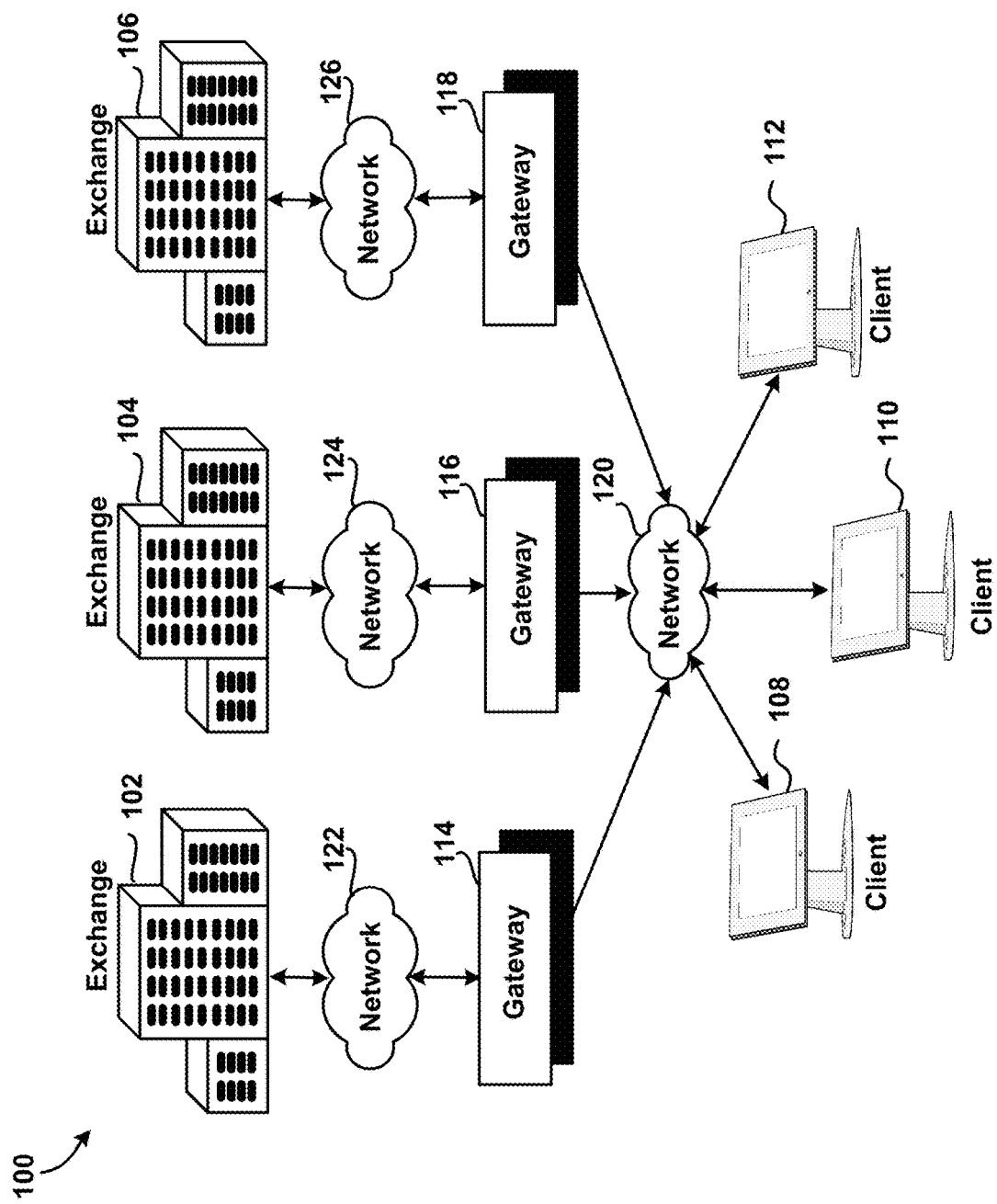
FIG. 1 is an example network configuration for a communication system utilized to access one or more exchanges.

The present invention provides a system and method for configuring and processing timed orders associated with at least one tradeable object being traded in an electronic trading environment. According to one example method, a trader may configure a timed order by defining one or more intra-day time triggers. For example, a first time trigger may define a first time during a trading session when the order should be automatically modified. It should be understood that modification of an order may include a number of actions, including deleting the order from one or more electronic exchanges, canceling/replacing the order with a new order, or modifying one or more order parameters, for example. Also, in addition to the first time trigger, a second time trigger may be defined to specify an order submission time during a trading session when the order should be automatically sent to the electronic exchange.

According to a preferred embodiment, the time triggers may be user configurable, and may include any user-configurable time during a trading session. Alternatively, rather than using a time trigger associated with a specific time during a trading session, a trader may define an order that is good for a specific time period. In such an embodiment, once an order is submitted to an exchange, an order's timer is activated and, if the order does not get filled during the specified time period, the order is automatically modified when the time period expires. It should be understood that many different embodiments are possible to define when the order's timer is activated. For example, as mentioned above, the timer may be activated when a trader submits such an order to an exchange. Alternatively, a timer may be linked to one or more market data events or trader related data events that, when detected, trigger the timer. Additionally, as will be described in greater detail below, the time period associated with the timed order may be variable, and the length of the time period may be based on any user-configurable equation having one or more trader-related or market-related parameters.

According to another example method, in addition to defining a specific time or time period in association with an order, a second parameter may be specified to define one or more actions to be taken once the order is deleted. For example, a post delete action may include sending one or more replacement orders to the same or different exchanges. According to a preferred embodiment, a replacement order may be user configurable so that a user can define one or more tradeable objects, one or more electronic exchanges, and an order quantity for the replacement order. Additionally, the electronic exchange, the tradeable object, and the order quantity for the replacement order may be the same or different than those associated with the deleted order. In one embodiment, for example, the order quantity of the replacement order may be automatically set to an unfilled order quantity of the deleted order, and, similarly to the deleted order, a replacement order could be a timed order as well.

While the present invention is described herein with reference to illustrative embodiments for particular applications, it should be understood that the present invention is not limited thereto. Those having ordinary skill of art will recognize that many additional modifications and embodiments are possible as well.

II. Hardware and Software Overview

FIG. 1 is a block diagram that illustrates an electronic trading system 100 in accordance with the preferred embodiments. The system 100 includes one or more exchanges 102, 104, 106 and one or more client devices 108, 110, 112. Intermediate devices such as gateways 114, 116, 118, routers, and other such types of client devices may be used to connect network 120 to networks 122, 124, 126 so that client devices 108, 110 and 112 and exchanges 102, 104, and 106 can communicate market information. It should be understood that the present invention is not limited to any particular system configuration. For example, networks 122, 124, and 126, or client devices 108, 110, 112 could connect separately to gateways 114, 116, 118. Of course, there are many other system configurations on which the preferred embodiments may be implemented.

A. Host Exchange

Host exchanges 102, 104, and 106 may represent electronic exchanges such as, for example, the London International Financial Futures and Options Exchange ("LIFFE"), the Chicago Board of Trade ("CBOT"), the New York Stock Exchange ("NYSE"), the Chicago Mercantile Exchange ("CME"), the German stock exchange—Exchange Electronic Trading ("Xetra"), or the European Exchange ("Eurex"), or any other exchange, which may include basic to more complex systems that automatically and electronically match incoming orders. These example exchanges and other exchanges are well known in the art. Communication protocols required for connectivity to one of these exchanges are also well known in the art.

Exchanges 102, 104, 106 allow traders to log onto a market to trade tradeable objects. As used herein, the term "tradeable objects," refers simply to anything that can be traded with a quantity and/or price. It includes, but is not limited to, all types of tradeable objects such as financial products, which can include, for example, stocks, options, bonds, futures, currency, and warrants, as well as funds, derivatives and metals. The tradeable object may be "real," such as products that are listed by an exchange for trading, or "synthetic," such as a combination of real products that is created by the user. A tradeable object could actually be a combination of other tradeable objects, such as a class of tradeable objects.

An exchange 102, 104, 106 can implement numerous types of order execution algorithms, and sometimes the type of algorithm depends on the tradeable object being traded.

The preferred embodiments may be adapted by one skilled in the art of work with any particular order execution algorithm. Some example order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE for example, splits all orders for the same price. The present invention is not limited to any particular type of order execution algorithm.

Regardless of the type of order execution algorithm used, each exchange 102, 104, and 106 preferably provides similar types of information to subscribing devices 108, 110, and 112. Market information may include data that represents the inside market, which is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, the exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchanges 102, 104, 106 can offer other types of market information such as the last traded price (LTP), the last traded quantity (LTQ), and order fill information.

B. Gateway

Gateways 114, 116, 118 are devices such as a mainframe, superminicomputer, minicomputer workstation, microcomputer that connect network 120 to networks 122, 124, 126 so that market information can be successfully passed between client devices 108, 110, 112 and exchanges 102, 104, 106. Gateways 114, 116, 118 preferably receive market information from the exchanges 102, 104, and 106 and convert it to a format compatible with the protocols used by the client devices 108, 110, 112 using conversion techniques known in the art. Also, as known by those skilled in the art, gateways 114, 116, 118 may have one or more servers to support data feeds, such as a price server for processing price information, an order server for processing order information, and a fill server for processing fill information. A trader at one of the client devices 108, 110, 112 can subscribe to price information, order information, and fill information for a particular market hosted at the exchanges 102, 104, and 106. The gateways 114, 116, and 118 also preferably receive transaction information, such as orders, order changes, queries, etc., from the client devices 108, 110, and 112 and forward that information to corresponding exchanges 102, 104, and 106.

C. Client Device

The client devices 108, 110, and 112 are devices that provide an interface for traders to trade at one or more markets listed with one, some, or all of the exchanges 102, 104, and 106. Some examples of client devices include a personal computer, laptop computer, handheld computer, and so forth. The client devices 108, 110, and 112, according to one preferred embodiment, include at least a processor and memory. The processor and memory, both well known computer components, are not shown in FIG. 1 for sake of clarity. Preferably, the processor has enough processing power to handle and process various types of market information. It should be understood that more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to processor for execution. Such a medium may take many forms, including but not limited to, non-volatile media, and transmission media. Non-volatile media includes, for example, optical or magnetic disks, such as a storage device. Volatile media include dynamic memory, such as main memory or random access memory ("RAM"). Common forms of computer-readable media include, for example, a floppy disk, a flexible disk, a hard disk, a magnetic tape, or any other magnetic medium, a CD-ROM, any optical medium, punch cards, paper tape, any other physical medium with patterns of holes, a RAM, a PROM, and EPROM, a FLASH-EPROM, and any other memory chip or cartridge, or any other medium from which a computer can read.

The client devices 108, 110, and 112 receive market information from any of the exchanges 102, 104, and 106. According to the preferred embodiments, market information is displayed to the trader(s) on the visual output device or display device of the client devices 108, 110, and 112. The output device can be any type of display. For example, the display could be a CRT-based video display, an LCD-based or a gas plasma-based flat-panel display, a display that shows three-dimensional images, or some other display type. The present invention is not limited to any particular type of display.

Upon viewing the market information or a portion thereof, a trader may wish to send orders to an exchange, cancel orders in a market, query an exchange, and so on. To do so, the trader may input various commands or signals into the client devices 108, 110, and 112, for example, by typing into a keyboard, inputting commands through a mouse, or inputting commands or signals through some other input devices. Upon receiving one or more commands or signals, the client devices 108, 110, and 112 preferably generate transaction information. For instance, a trader may click a mouse button to initiate an order to buy a tradeable object. Then, transaction information would include an order to buy a particular quantity of the tradeable object at a particular price. There are many different types of messages and/or order types that can be submitted, all of which may be considered various types of transaction information. Once generated, transaction information is sent from the client devices 108, 110, and 112 to the host exchange 102, for example, over the networks 120, 122, 124, and 126.

Figure 2:
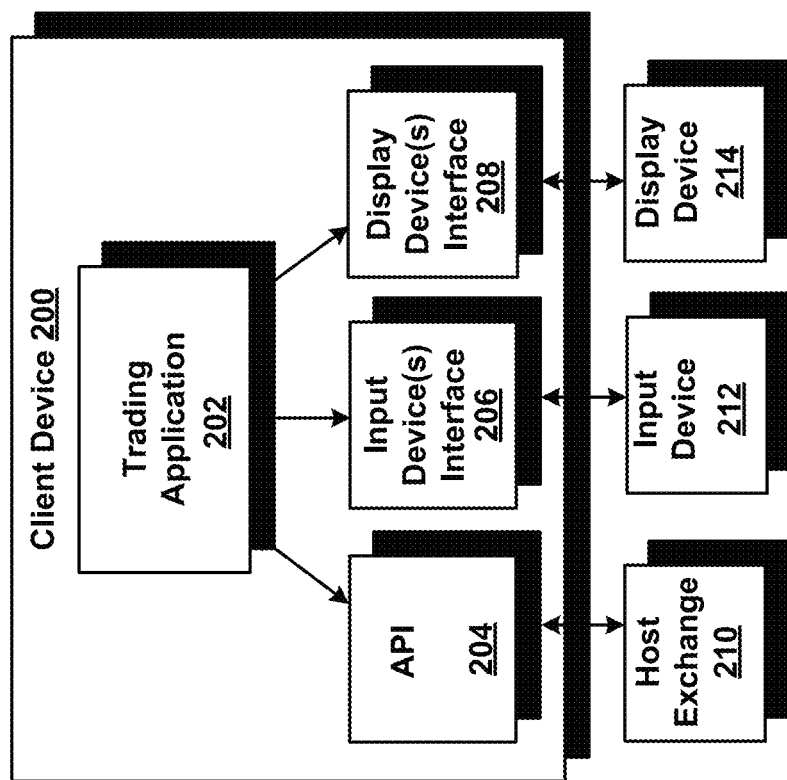
FIG. 2 is an example system overview of a client device that may be used to implement the example embodiments described herein.

FIG. 2 shows an overview of an example client device 200 which may be similar to the type of client devices 108, 110, 112 shown in FIG. 1. The client device 200 can be any particular type of computing device, examples of which were enumerated above with respect to the client devices. According to the preferred embodiments, the client device 200 has a trading application 202 stored in memory that when executed arranges and displays market information in many particular ways, usually depending on how the trader prefers to view the information. The trading application 202 may also implement the preferred embodiments described herein. Alternatively, the preferred embodiments described herein may occur elsewhere such as outside of the trading application 202 on the client device 200, on a gateway, or on some other computing device. Preferably, the trading application 202 has access to market information through an API 204 (or application programming interface), and the trading application 202 can also forward transaction information to the exchange 210 via the API 204. Alternatively, the API 204 could be distributed so that a portion of the API rests on the client device 200 and a gateway, or at the exchange 210. Additionally, the trading application 202 may receive signals from the input device 212 via the input device interface 206 and can be given the ability to send signals to a display device 214 via a display device interface 208.

D. Trading Interface

A commercially available trading application that allows a user to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. Portions of the X_TRADER® and the MD Trader™-style display are described in U.S. Pat. No. 6,772,132, entitled "Click Based Trading With Intuitive Grid Display of Market Depth," filed on Jun. 9, 2000, U.S. Pat. No. 7,127,424, entitled "Click Based Trading With Intuitive Grid Display of Market Depth and Price Consolidation," filed on Oct. 5, 2001, and U.S. Pat. No. 7,389,268, entitled "Trading Tools For Electronic Trading," filed on Apr. 19, 2002, the contents of each of which are incorporated herein by reference. Further, it should be understood that orders in the system illustrated in FIG. 1 could also be placed using any automatic trading applications as well. Additionally, the preferred embodiments are not limited to any particular product that performs translation, storage and display functions.

III. Timed Order Entry and Modification

A trader may configure a number of timed orders to be sent to an electronic exchange. According to a preferred embodiment, order parameters associated with the timed orders include an order lifetime period parameter that may be used by a trader to define a time when the order should be modified such as deleted, cancelled/replaced with a new order, or changed, for example.

It should be understood that the order lifetime period may be defined using many different methods. In one embodiment, an order may be good for a particular time period defined with an order timer that may be triggered upon detecting that the order has been submitted to an exchange. Alternatively, rather than triggering the timer upon detecting submission of the order to an exchange, the timer may be triggered upon detecting one or more predetermined events. The events that trigger start of the timer may be any user-related events or market data related events. Additionally, it should be understood that the length of the order activity time period may be dynamic rather than static, and the length of the order time period may dynamically change based on any user-defined equation or formula having one or more user-related or market data related parameters. For example, the time period may be configured so that its length can dynamically change based on market volatility, or upon detecting some events, such as detecting a sudden market movement, or receiving predetermined data from outside sources, such as receiving an unemployment number, for example. Alternatively, rather than defining a good for a particular time period order, a trader may define an order that will be good until a specific time. In such an embodiment, rather than defining a time period, a trader may define a specific time during a trading session when an order should be modified, such as deleted from an exchange, or cancelled/ replaced with a new order, depending on the order configuration. For example, a trader may define a specific time, such as 11:32 a.m., when an order should be automatically deleted or when one or more order parameters should be modified. In addition to defining when an order should be removed from an exchange, a trader may also define a time when the order should be submitted to the exchange. It should be understood that timed orders described herein are not limited to being traded at a single electronic exchange, and the timed orders could be cross-exchange and cross-tradeable object orders.

Figure 3:
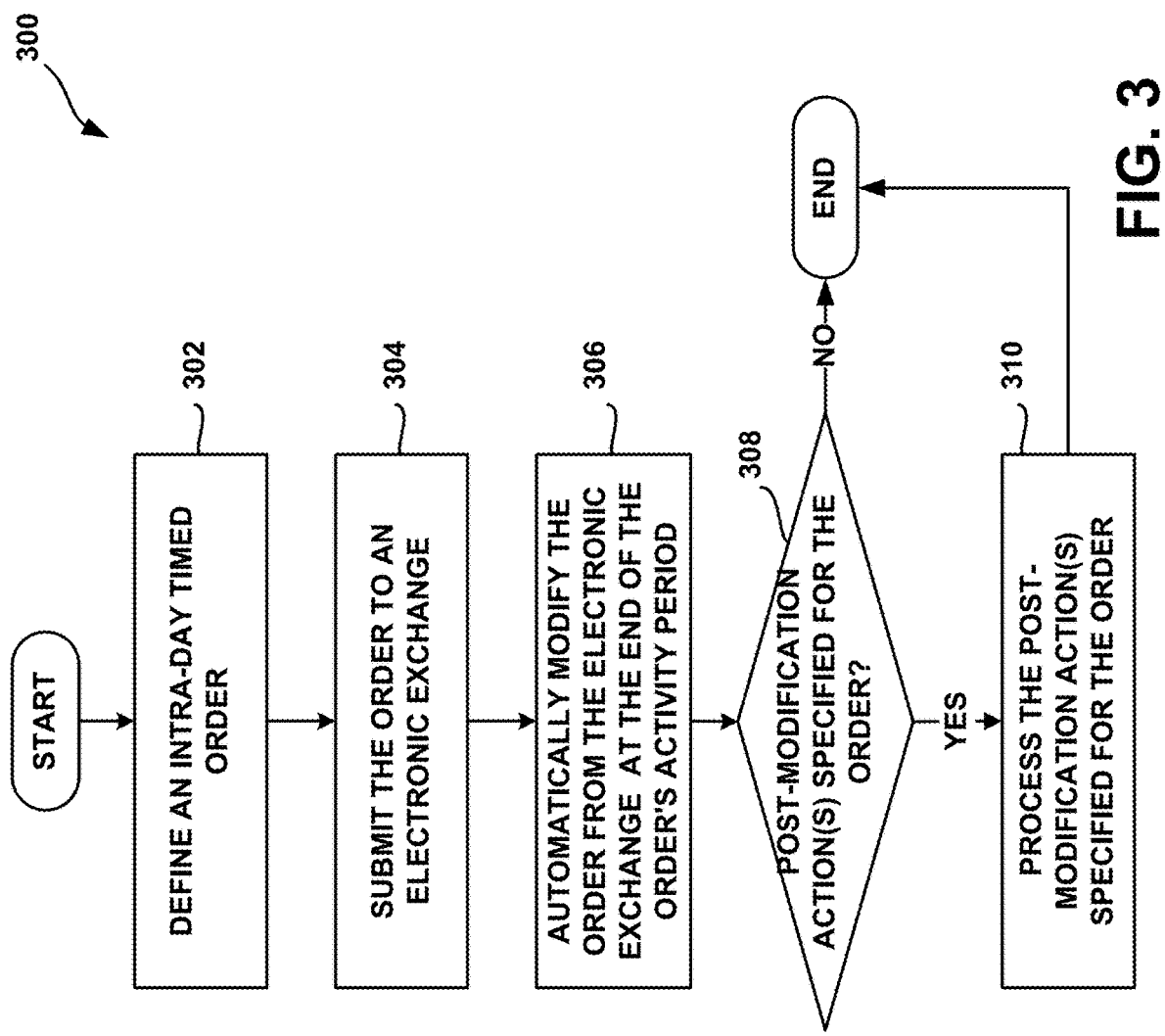
FIG. 3 is a flow chart illustrating one example method for processing timed orders in an electronic trading environment.

The preferred method including the timed order entry and order modification is described in more detail with respect to the flowchart 300 shown in FIG. 3. It should be understood that the flowchart in FIG. 3 provides only an illustrative description of one method for the timed order entry and modification, and that more or fewer steps may be included in the flowchart, and the steps may occur in one or more orders that are different from the order of the steps shown in FIG. 3. In one embodiment, a trading application may perform the steps illustrated in FIG. 3, however, it should be understood that the preferred embodiments can be readily applied to any other trading related application that has an automatic, semi-automatic, or non-automatic order entry system. Further, it should be understood that the steps of the method illustrated in FIG. 3 may be performed by one or more network entities, such a client device, gateway, and/or exchange, or a combination thereof, using the teachings described herein.

At step 302, a trader defines an intra-trading day timed order to be sent to an electronic exchange. It should be understood that rather than defining a specific time or time period for each order, a trader may predefine a default lifetime period for each order type. In such an embodiment, any time a trader decides to send a predetermined order type to an electronic exchange, such an order is already associated with a default time period that may be later changed by a trader to a different value. For example, a trader may define one default time period, such as 20 seconds, for a stop order, and another default time period, such as 10 seconds, for a limit order.

As mentioned in earlier paragraphs, a timed order may be defined using different methods including defining a time period associated with a trigger activating the time period, e.g., good for a particular time period order, where the trigger may be associated with a predetermined event, such as sending an order to an exchange or any other market data or user data related event. Also, as mentioned earlier, the time period may dynamically vary during a trading session based on any user-defined formula. For example, the time period may vary based on time of day, so that the time period associated with a timed order is longer at the beginning of the trading session and gets shorter as the orders get submitted closer to the end of the trading session.

Also, as mentioned earlier, rather than defining a time period, a trader may define a specific time during a trading session when the order should be modified, and another time during the trading session when the order should be sent to the exchange. It should be understood that the specific time when an order should be sent to an exchange may be defined in combination with a variable time period defined for the order. In a preferred embodiment, the time associated with each trigger is based on an exchange time rather than local time on client devices or gateways. However, the local time on the client device or gateway may be synchronized to the time being used at one or more electronic exchanges.

At step 304, the order is submitted to an electronic exchange. The order may be associated with one or more tradeable objects, such as a spread being traded at one or more electronic exchanges. In an embodiment in which a trader defines a time at which to automatically enter the order to an exchange, a trading application on a client device may automatically enter the order to the exchange once the predefined time is detected. It should be understood that rather than a client device automatically sending an order to an electronic exchange when an order submission time is detected, the client device may send the order to an order queue at a gateway before the order submission time is triggered. Then, the gateway rather than the client device may send the order to the exchange when the time trigger is detected. Further, alternatively, an order associated with an order submission time trigger may be sent to an order queue at an electronic exchange at some time before the order submission time is reached, and the exchange may activate the order once the time trigger is detected.

At step 306, if the order is not filled until the end of the specified time period, the order is automatically modified. As mentioned earlier, it should be understood that an order may be deleted from by sending a delete action request to one or more exchanges associated with the order, or cancelled/replaced with a new order by sending a "cancel/replace" request to one or more exchanges causing the exchange(s) to cancel the pending order and to replace it with a new order. Further, alternatively, the order modification may trigger a "change" request causing one or more order's parameters to be changed at the end of the specified time period or at a specified time. It should be understood that if an order, such as a spread order, is associated with two or more tradeable objects being traded at two or more electronic exchanges, all order legs associated with the spread order are automatically deleted from all electronic exchanges when the specified time is reached. Alternatively, once one leg of a spread is filled, a second timed spread leg order can be sent to the same or different exchange. In such an embodiment, if the second leg does not get filled until a predetermined time, the order may be replaced with a market order.

The order modification process may be accomplished using different methods. For example, a client device or a gateway may monitor order modification time periods or order modification time triggers, and may be configured to send order modification requests to one or more electronic exchanges at the end of each order's lifetime. Alternatively, if an exchange is configured to process timed orders having time triggers defined herein, the exchange may automatically modify one or more user-defined order parameters, delete such orders at the end of each time period or upon detecting each order's delete time trigger, or cancel/replace the order with a new order.

In addition to defining when to modify an order from an exchange, the order may be associated with a post modification action to be taken in response to modifying the order at one or more exchanges at a predetermined time during a trading session. At step 308, a trading application at a client device or some other application at another network entity determines if a post-modification action has been specified for the order. If no post modification action has been specified, the method 300 terminates. Otherwise, at step 310, the trading application processes one or more post modification actions specified for the order.

The post modification action may include a request to send one or more replacement orders to one or more exchanges and for one or more tradeable objects. It should be understood that a replacement order may be sent to the same or different exchange(s) and may be associated with the same or different tradeable object(s) as the deleted order, for example. It should be understood that a replacement order may be user configurable so that, for example, a trader can configure an order price, an order quantity, an order type, a name of tradeable object(s), and a name of electronic exchange(s) to which the replacement order should be submitted. Alternatively, a replacement order may be associated with the same tradeable object as the deleted order, and an order quantity of a replacement order may be set to an unfilled order quantity of the deleted order. Additionally, in one embodiment, an order price of a replacement order may be based on a market level at the time of submitting the replacement order to an electronic exchange. For example, a replacement order could be a market order such that the replacement order is placed at inside market price. Alternatively, rather than defining the replacement order as a market order, a trader may specify a number of ticks away from the market level at the time when the replacement order is to be submitted to an electronic exchange.

It should be understood that, in addition to configuring order parameters, a replacement order could be also a timed order configured using one or more methods described above. Additionally, a user may control when the replacement order is sent to an exchange. For example, a replacement order can be automatically sent to an exchange upon deleting the original order. Alternatively, the time when the replacement order is submitted to the exchange may be user configurable so that a trader may configure a time trigger defining a time during a trading session at which the replacement order should be submitted to one or more exchanges. It should be understood that the time when the order is modified may be during the trading session when the order is submitted to one or more electronic exchange or any time during a next trading session.

According to one example embodiment, a trader may configure timed orders using graphical interfaces. Two of such interfaces will be described below in reference to FIGS. 4 and 5. However, it should be understood that the present invention is not limited to the interfaces described hereinafter, and different or equivalent interfaces could also be used.

Figure 4:
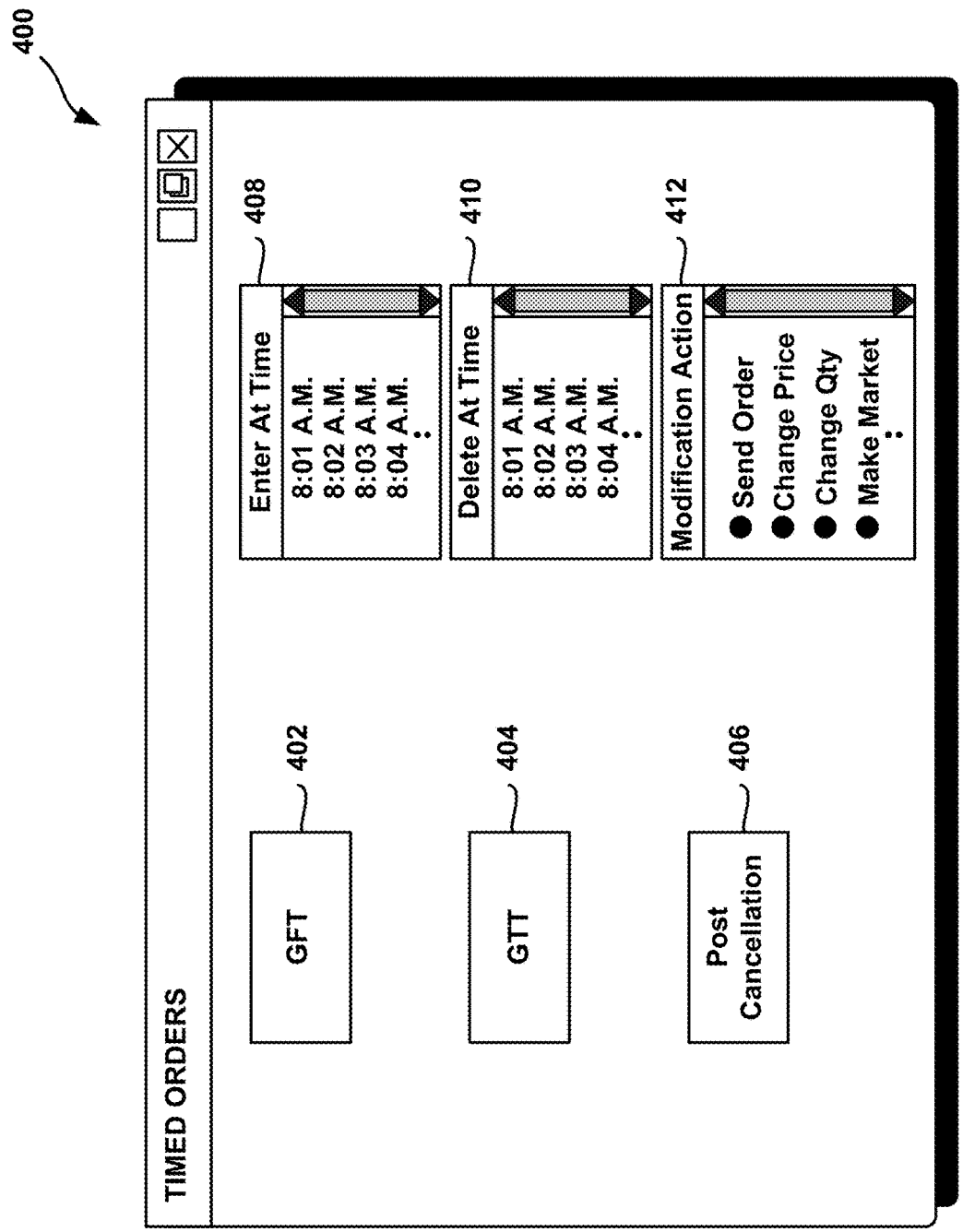
FIG. 4 is an example graphical display for configuring timed orders according to one embodiment.

FIG. 4 is an example graphical interface 400 for configuring timed orders according to one embodiment. According to the display 400, a trader can specify a Good From Time ("GFT") order parameter 402, a Good Till Time ("GTT") order parameter 404, and a post cancellation order parameter associated with one or more post order cancellation actions to be taken when the original order is deleted. It should be understood that different methods can be used to display the graphical interface 400 via the trading interface. In one embodiment, a graphical selection icon may be displayed in relation to a trading interface so that the trader can activate the graphical interface 400 upon selecting the graphical selection icon. Alternatively, the interface 400 may be activated upon detecting one or more predetermined key selection inputs. Regardless of how the display 400 is activated, the trading application on the client device may display the graphical interface 400 to a trader so that the trader can configure one or more timed order parameters.

Upon selecting the GFT icon 402, a trader may select one of the times displayed in association with a time range display 408 to specify a time during a trading session when an order should be submitted to an exchange. Similarly, the trader may specify the time at which the order should be automatically modified at the exchange by first selecting the GTT icon 404 and then selecting one of the times displayed in association with a time range display 410. As illustrated in FIG. 4, a trader could scroll down/up different times associated with the time range displays 408 and 410 to select desired times defining when to enter and modify the order to/from an electronic exchange, respectively. However, it should be understood that different time selection means could also be used rather than the one illustrated in FIG. 4. As will be illustrated in FIG. 5, and as mentioned earlier, a trader could define a time period rather than a specific time to define when an order should be modified at one or more exchanges. In such an embodiment, in addition to defining a time period, a trader could also define a trigger defining when a timer associated with the time period should be activated.

Also, as explained in greater detail in relation to the flow chart in FIG. 3, a trader may specify a post modification action to be processed once the original order is deleted, for example. In the embodiment illustrated in relation to the display 400, the trader may select one of the post-modification actions by first selecting the Modification icon 406 and then selecting one or more of the order modification actions 412. It should be understood that when the trader selects one of the order modification actions 412, such as a "Send Order" action, another interface could be displayed to enable the trader to define a replacement order. Similarly, for example, when the trader selects a "Change Price" icon, another interface could be displayed so that a trader can define a price level for a replacement order. It should be understood that the order modification actions are not limited to the actions displayed in relation to the interface 400, and more, fewer, different, or equivalent actions could be defined as well. Additionally, the order modification actions could be user configurable, and the actions are not limited to sending a new order. For example, when an exchange supports the "Change" functionality, a trader may configure an order so that rather than automatically deleting the order at a predefined time, one of the order parameters may be automatically changed when the predetermined time is detected.

Figure 5:
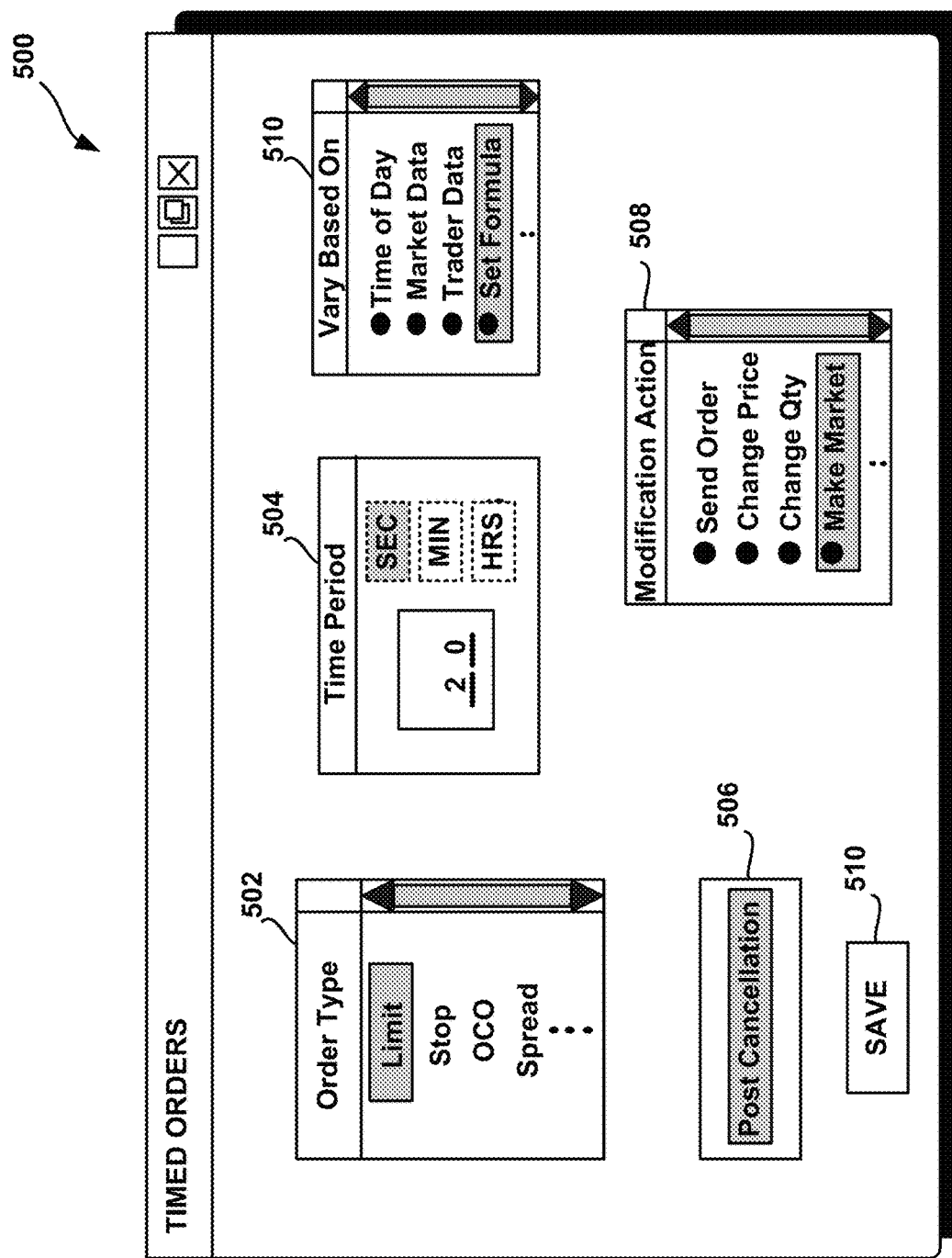
FIG. 5 is another example graphical display that may be used for configuring timed orders according to another embodiment.

It should be understood that the display for configuring timed orders is not limited to the display illustrated in FIG. 4, and different displays could also be used. FIG. 5 is a block diagram illustrating another example graphical display 500 that may be used to configure timed orders. Using the graphical display 500, a trader may define default order time periods for different order types so that every time the trader submits a predetermined order type to an exchange, the order remains unmodified until the end of the defined order time period. In the embodiment illustrated in FIG. 5, a timer associated with a time period specified for the order may be activated when the order is submitted to an exchange. However, alternatively, another interface could be displayed to enable a trader to define events that may activate the timer associated with the time period. Then, if the order does not get filled during the predefined time period, the order may be automatically modified at the end of the defined time period.

The graphical display 500 includes an order type selection display 502 for displaying and enabling a trader to select a number of order types. The illustrated order types include a limit, stop, order cancel order ("OCO"), and spread order type. However, it should be understood that different order types could also be used, and the order types to be displayed via the order type selection display 502 may be user configurable. Once the order type is selected, such as a limit order type in FIG. 5, a trader may specify an order time period by inputting a desired time via a time period display 504 and selecting a time unit such as seconds, minutes, or hours displayed in relation to the numerical time period. In the embodiment illustrated in FIG. 5, a default order time period defined for a limit order is 20 seconds so that every time a trader sends a limit order to any exchange, a time trigger associated with the time period is activated and, if the order does not get filled during 20 seconds, the order will be automatically modified.

Also, as mentioned earlier, a trader may configure a timed order so that the time period may dynamically vary based on a plurality user-configurable parameters. As illustrated in FIG. 5, a trader may define variance parameters via an interface 510 that allows a trader to vary the time period based on time of day, market data, trader data, or using any user-configurable formula, for example. It should be understood that once a trader selects one of the options, another interface could be displayed related to the selected option.

Similarly to the display described in reference to FIG. 4, the graphical display 500 includes a Modification icon 506 associated with a number of Modification Action icons 508 that have been described in reference to FIG. 4. As illustrated in FIG. 5, the action selected is "Make Market" so that if the original limit order is not filled or is partially filled during the twenty seconds, the limit order is automatically deleted, and a replacement market order is placed to an electronic exchange. It should be understood that an order quantity of the replacement order may be set to the unfilled order quantity of the limit order or to any other user-configurable quantity.

Similarly to other working orders, a trader would be able to view timed working orders via a trading interface. In one embodiment, color-coding may be used to distinguish working timed orders from other working orders. For example, when a timed order is submitted to an exchange and is displayed via a trading interface as a working order, the timed working order indicator can be color-coded using one or more user configurable colors. Then, as the time progresses and the order lifetime gets closer to the end, the color of the timed working order may change to a different user-configurable color, such as red, for example. It should be understood that a trader could also configure when the color-coding of the working timed order changes. For example, one color can be used until an order half time, and then one or more other colors could be used as the time gets closer to the end of the order lifetime. However, it should be understood that rather than color-coding timed orders, any user-configurable graphical indicators could be displayed in relation to a timed working order to indicate that the order is a timed order. Further, alternatively, a numerical indicator could be used in association with each working timed order to indicate the remaining time until each order will be automatically modified. Also, rather than using color-coding or numerical indicators, timed orders may start flashing as the order time period gets closer to an end, and the frequency of flashing may depend on how soon the order will be deleted or cancelled/replaced by another order.

In one alternative embodiment, a trader may wish to prevent automatic modification of the order at the end of predefined time period or at a specific predefined time. For example, if a trader sees that the market is moving in a direction of the price at which the timed order has been placed and the color-coding of the order indicates that the order's lifetime is about to expire, the trader may wish to keep the order on the market rather than to have the order automatically modified, such as deleted, at the end of the order lifetime. For example, to enable a trader to override an automatic deletion of a working timed order, a trading application may provide a user selection input that overrides the automatic order deletion. Such user selection input may take many different formats. For example, when a trader inputs one or more timed orders, a trading interface may automatically display a graphical user selection input that may be used by a trader to override the automatic order deletion. In such an embodiment, a trader may first select a desired timed order and then the graphical user selection input to override the lifetime of the order. Alternatively, rather than using a graphical selection input, a trader may input a predetermined key combination, or a mouse click. Further, alternatively, a user may directly click on the order, and such an action may activate extension of an order time period by a predefined time period. It should be understood that rather than totally overriding the order lifetime by selecting a predetermined input, the selection of such an input may cause extension of the order lifetime by a predetermined, user-configurable time period.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

Further, it will be apparent to those of ordinary skill in the art that methods involved in the system and method for timed orders in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals. The claims should not be read as limited to the described order or elements unless stated to that effect. Therefore, all embodiments that come within the scope and spirit of the following claims and equivalents thereto are claimed as the invention.

The invention claimed is:

1. A method including:
receiving by an electronic exchange a timed order from a computing device, wherein the timed order is associated with a first time trigger defining a time when the timed order is automatically modifiable on the electronic exchange;
monitoring by the electronic exchange a timer for a time period associated with the timed order, wherein the time period for the timer is based on the first time trigger;
detecting by the electronic exchange the expiration of the timer representing the first time trigger for the timed order; and
automatically modifying by the electronic exchange the timed order upon detecting the first time trigger, wherein said automatically modifying includes replacing the timed order.

2. The method of claim 1, wherein the computing device includes a client device.

3. The method of claim 1, wherein the computing device includes a trading application.

4. The method of claim 1, wherein the computing device includes a gateway.

5. The method of claim 1, wherein the time period for the timer is fixed.

6. The method of claim 1, wherein the time period for the timer is variable.

7. The method of claim 1, wherein the time period for the timer is based on a detection of a market data related event specified by the first time trigger.

8. The method of claim 1, wherein the time period for the timer is based on a detection of a market volatility related event specified by the first time trigger.

9. The method of claim 1, wherein the time period for the timer is based on a source external to the electronic exchange specified by the first time trigger.

10. A method including:
receiving by an electronic exchange a timed order from a computing device, wherein the timed order is associated with a first time trigger defining a time when the timed order is automatically modifiable on the electronic exchange;
monitoring by the electronic exchange a timer for a time period associated with the timed order, wherein the time period for the timer is based on the first time trigger;
detecting by the electronic exchange the expiration of the timer representing the first time trigger for the timed order; and
automatically modifying by the electronic exchange the timed order upon detecting the first time trigger, wherein said automatically modifying includes modifying at least one order parameter associated with the timed order.

11. The method of claim 10, wherein the computing device includes a client device.

12. The method of claim 10, wherein the computing device includes a trading application.

13. The method of claim 10, wherein the computing device includes a gateway.

14. The method of claim 10, wherein the time period for the timer is fixed.

15. The method of claim 10, wherein the time period for the timer is variable.

16. The method of claim 10, wherein the time period for the timer is based on a detection of a market data related event specified by the first time trigger.

17. The method of claim 10, wherein the time period for the timer is based on a detection of a market volatility related event specified by the first time trigger.

18. The method of claim 10, wherein the time period for the timer is based on a source external to the electronic exchange specified by the first time trigger.

* * * * *